March 23, 1965     C. S. COCKERELL     3,174,571
MEANS FOR SUPPORTING LOADS

Filed June 12, 1961     3 Sheets-Sheet 1

Inventor
C. S. COCKERELL
By Cameron, Kerkam & Sutton
Attorneys

March 23, 1965 C. S. COCKERELL 3,174,571
MEANS FOR SUPPORTING LOADS
Filed June 12, 1961 3 Sheets-Sheet 2

Inventor
C. S. COCKERELL
By Cameron, Kerkam & Sutton
Attorneys

United States Patent Office 3,174,571
Patented Mar. 23, 1965.

3,174,571
MEANS FOR SUPPORTING LOADS
Christopher Sydney Cockerell, Southampton, England, assignor to Hovercraft Development Limited, London, England, a British company
Filed June 12, 1961, Ser. No. 116,492
Claims priority, application Great Britain, June 16, 1960, 21,263/60
25 Claims. (Cl. 180—7)

This invention relates to apparatus for supporting and moving loads or load-carrying devices.

According to the invention there is provided a load carrying apparatus for movably supporting a load comprising a first member and a second member, capable of relative movement, the first member having at least one surface co-operating with at least one surface of the second member, the co-operating surfaces being substantially parallel, and means for forming at least one curtain of fluid between the co-opearting surfaces to enclose a space between them and to form and maintain at least one cushion of pressurised fluid in the said space.

According to a further feature of the invention there is provided a load carrying apparatus for movably supporting a load comprising a first member forming a housing having a concave symmetrical surface of rotation, a second member partially surrounded by the said housing and capable of rotation within the said housing, the surface of the second member and the concave surface of the first member being substantially parallel, and means for forming at least one curtain of fluid between the two surfaces to enclose a space between them and to form and maintain at least one cushion of pressurised fluid in said space, the cushion tending to maintain a clearance between the two surfaces.

One particular form of such apparatus is a ball mounted in a housing and according to a feature of the invention there is provided a load carrying apparatus for movably supporting the load comprising a spherical member co-opearting with a part-spherical concave housing, the housing being provided with at least one supply port from which issues a curtain of fluid, the curtain of fluid flowing across the gap which in operation exists between the spherical member and the housing and forming and maintaining at least one cushion of pressurised fluid between the spherical member and the housing.

An alternative form of the invention may comprise a cylindrical member mounted in a suitable housing and according to a further feature of the invention there is provided a load carrying apparatus for movably supporting a load comprising a cylindrical member co-operating with a cylindrical or part-cylindrical housing, with means for forming and maintaining at least one cushion of pressurised fluid between the cylindrical member and the housing as aforesaid.

Any suitable fluid may be used for the formation of the curtains and cushions. For convenience, hereinafter, the fluid will be considered as air, although other gases such as exhaust gases, or liquids such as water, or mixtures of gases and liquids, can be used.

The invention will readily be understood by the following description of certain embodiments in conjunction with the accompanying drawings, in which.

Figure 2:
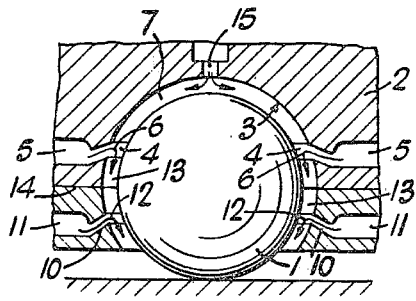
FIGURE 2 is a modification of the embodiment illustrated in FIGURE 1.
Figure 3:
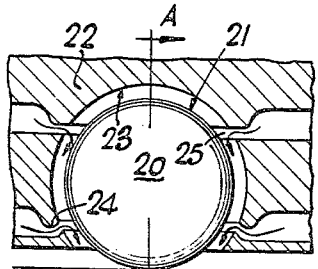
Figure 4:
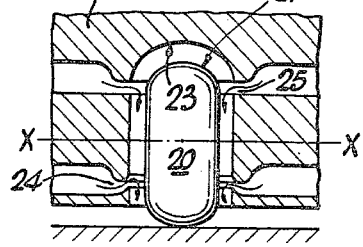
Figure 5:
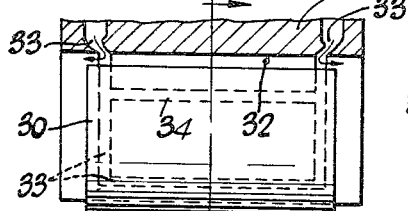
Figure 6:
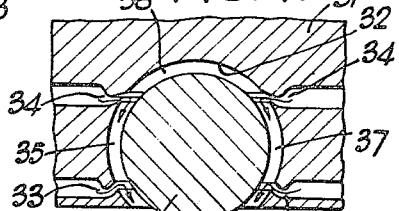
Figure 7:
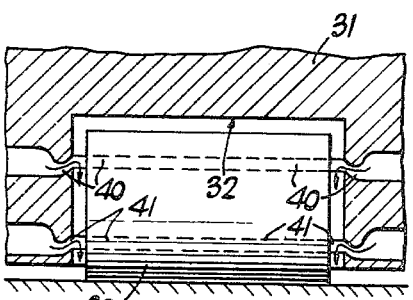
Figure 8:
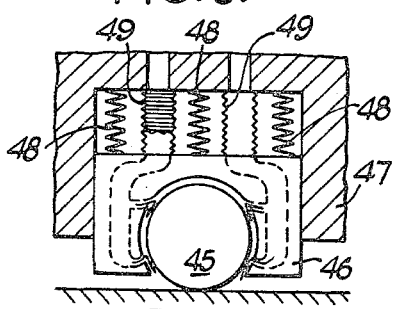
Figure 9:
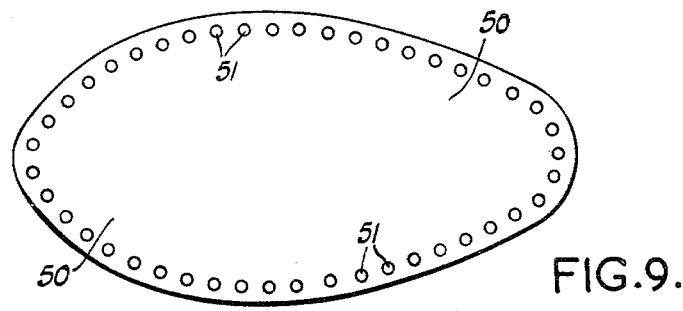
Figure 10:
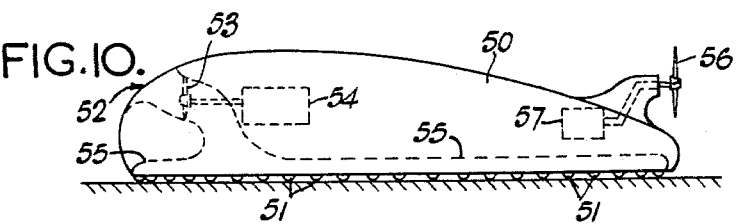
Figure 11:
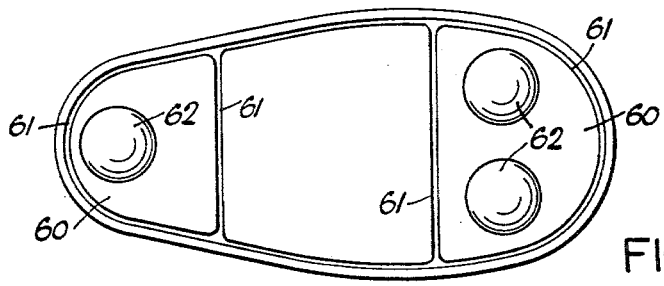
Figure 12:
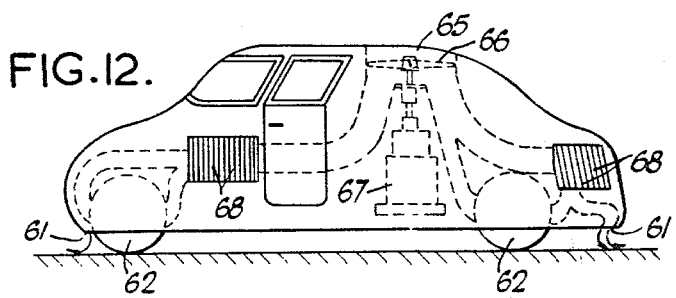
Figure 13:
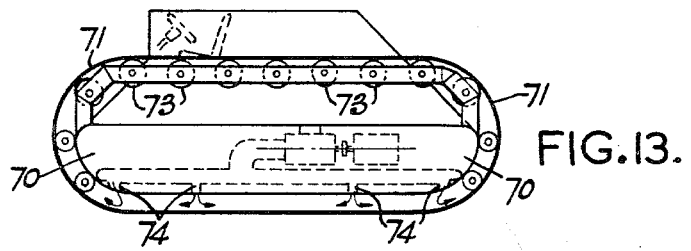
Figure 14:
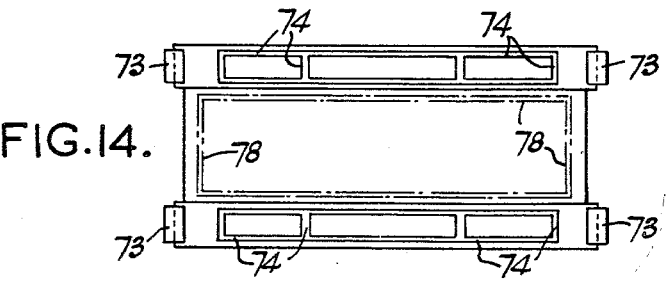
Figure 15:
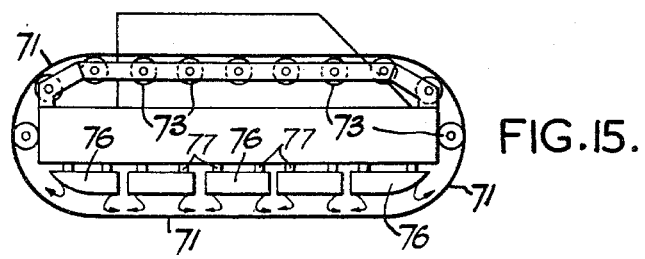
Figure 16:
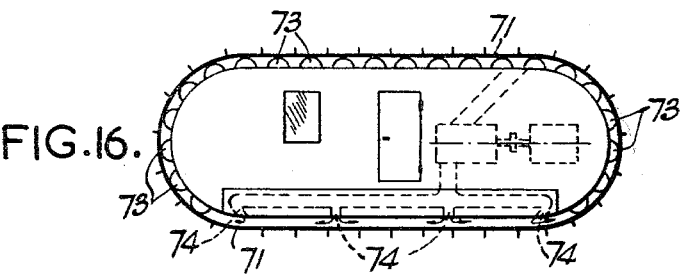

FIGURE 3 is diagrammatic cross-section of an alternative form of the invention using a spherical roller, FIGURE 4 is a cross-section on the line A—A of FIGURE 3, FIGURE 5 is a diagrammatic cross-section of a further form of the invention using a cylindrical roller, FIGURE 6 is a cross-section on the line B—B of FIGURE 5, FIGURE 7 is a modification of the form shown in FIGURE 5, FIGURE 8 is a diagrammatic cross-section illustrating a spring supported arrangement of the invention, FIGURE 9 is an inverted plan view of a vehicle provided with a number of members as illustrated in FIGURE 2, FIGURE 10 is a side view of the vehicle shown in FIGURE 9, FIGURE 11 is an inverted plan view of a further form of vehicle having a small number of large members of the form illustrated in FIGURE 2, FIGURE 12 is a side view of the vehicle shown in FIGURE 11, FIGURE 13 is a side view of a track-laying vehicle embodying a further feature of the invention, FIGURE 14 is an inverted plan view of the vehicle shown in FIGURE 13 with the tracks removed for clarity, FIGURE 15 illustrates a modification of the vehicle illustrated in FIGURE 13, and FIGURE 16 is a side view of a further form of track-laying vehicle.

Figure 1:
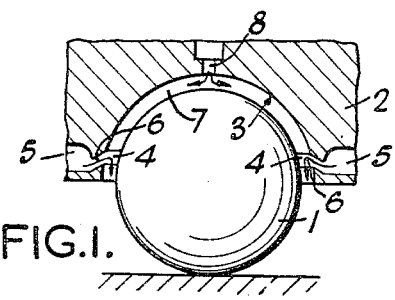
FIGURE 1 is a diagrammatical cross-section of one embodiment using a ball.

The number and disposition of the fluid curtains necessary will depend upon the configuration of the co-operating members. In FIGURE 1, one member is in the form of a ball 1, mounted in another member 2 having concave spherical housing 3. An annular supply port 4 is formed in the housing 3, extending circumferentially in a plane or zone normal to the vertical axis of the ball 1 and the housing 3. The supply port 4 is positioned so that at all times it is above the equatorial position of maximum character of the ball. Air fed to the supply port via a duct 5, forms a curtain 6 of what may be termed a zonal configuration between the spherical housing 3 and the ball 1, forming and maintaining a cushion of pressurised air in the enclosed space 7. As the supply port 4 and the air curtain 6 are always above the maximum diameter of the ball, tendency for the ball to rise further into the housing will create a pressure rise which tends to resist such movement and thus maintain the clearance between the ball and the housing.

An arrangement, such as is illustrated in FIGURE 1, does not provide the maximum positional stability of the ball in the housing. This can be improved by providing further supply ports, for example as indicated at 8, further air curtains being formed to sub-divide the cushion formed in space 7.

FIGURE 2 illustrates an embodiment similar to that of FIGURE 1, but in which the spherical housing 3 is increased in depth and a further annular supply port 10 is provided in the housing. Air is fed to the supply port 10 via a duct 11, and a further air curtain 12 is formed. A further cushion of air is thus formed in the space 13 between the two air curtains 6 and 12. This additional cushion in the space 13 will assist in maintaining the ball 1 in a central position in the housing 3. It is not normally sufficient to provide only the supply port 10 forming the air curtain 12 in a configuration as shown in FIGURE 2, as movement of the ball upwards into the housing is liable to produce only a relatively small increase in pressure of the air cushion. Further, as the ball moves upwards into the housing the gap to be traversed by the air curtain 12 is increased with the effect of weakening the curtain which would thus be only able to maintain a lower cushion pressure.

The configuration shown in FIGURE 2 is convenient in that the housing 3 can be such that the ball is at all times retained within the housing, although it will then be necessary to provide some means of assembling the ball into the housing, such as by making the lower part of the housing detachable at the line 14. Further supply ports, as shown at 15, may be provided to further sub-divide the cushion.

An arrangement having a ball is capable of movement in any direction, but the invention is equally applicable to arrangements having a more restricted movement as illustrated in FIGURES 3 and 4. It comprises a cylindrical member 20, having a spherically rounded profile 21, mounted in a concave housing 22 having a similar internal profile 23 as the external profile 21 of the cylindrical member 20. The cylindrical member thus is only able to rotate about its longitudinal axis X—X. Two annular supply ports 24 and 25 are provided in the housing, positioned as in the previous example of FIGURE 2. The operation of this example is the same as the example shown in FIGURE 1, with the exception that, as the cylindrical member can only rotate about one axis, the support can therefore move over a surface only in the direction substantially normal to this axis.

The invention is also applicable to cylindrical members which are long compared to their diameters, as illustrated in FIGURES 5 and 6. In this example a cylindrical member 30 is shown mounted within an open-ended cylindrical housing 31, having a part-cylindrical concave surface 32. Supply ports 33 and 34 are formed in the housing for the formation of curtains of air which maintain cushions of pressurised air at 35, 36 and 37. A cylindrical member can only rotate about its longitudinal axis and for long members, when used on apparatus which it is desired to steer round corners for example, considerable slipping must occur at some points of contact between the cylindrical member and the surface. This can be mitigated to some extent by dividing the cylindrical member into short sections. To reduce leakage of the cushion between the sections, sealing means may be provided. The cylindrical member 30 may, of course, extend beyond the ends of the housing 31.

When constructed as shown in FIGURES 5 and 6 it is necessary to provide some means of restricting endwise movement of the cylindrical member 30 in the housing 31 so that at all times the air curtains are in contact with the surface of the cylindrical members. Alternatively, the housing may partially enclose the ends of the cylindrical member, as shown in FIGURE 7. In this example the housing extends round the ends of the cylindrical member 30, supply ports 40 and 41 being formed in the housing 31 for the production of curtains and cushions of air, as described above. In such an arrangement, cushions of pressurised air will be formed between the end surfaces of the cylindrical member 30 and the co-operating end surfaces of the housing 31. These cushions of pressurised air will act to restrain the cylindrical member from endwise movement.

To provide a resilient suspension or support system, the housing may itself be supported in a further housing as shown diagrammatically in FIGURE 8. The rotating member 45 which may be cylindrical, spherical, or the like, is mounted in a housing 46 which in turn is slidably mounted in a further housing 47. The housing 46 is resiliently urged to its downward position by springs 48, suitable flexible pipes 49 being provided for the supply of air to the housing 46. The housing 46 can thus move up and down in the housing 47 under the control of the springs 48 to provide a resilient suspension.

Load carrying apparatus as so far described is readily applicable to vehicles for travelling over land and similar surfaces. FIGURE 9 is an inverted plan view of one form of vehicle embodying a member of sets of load carrying apparatus, FIGURE 10, being a side view of the same vehicle. Positioned in the bottom of the body 50 of the vehicle, adjacent to the periphery thereof, are a number of support members 51. Each of the members 51 is, for example, as shown in FIGURE 2. Air for the supporting members enters via an air intake 52 at the front of the vehicle, being compressed by a propeller 53 driven by a motor 54 and supplied to the supply ports via a duct 55. That is, assuming that the members 51 are constructed as shown in FIGURE 2, the duct 55 communicates with the supply ducts 5 and 11 of members 51 which in turn supply air to the supply ports 4 and 12, and also communicates with and delivers air to the further supply ports 15. The vehicle may be propelled by any suitable means for example by a propeller 56 mounted on the top of the vehicle body at the rear and driven by a motor 57.

The supporting members instead of only being positioned round the periphery of the vehicle, may be provided over the whole of the bottom of the vehicle, or for a substantial part thereof. They may be used as a landing gear, or as a means for preventing unintentional contact by the bottom of the vehicle with the ground.

Load carrying apparatus as described above may also be provided for vehicles which art themselves normally supported by one or more cushions of pressurised gas. Such an arrangement is illustrated in FIGURES 11 and 12. The vehicle 60 is suported in normal operation by a cushion of air formed and contained by curtains of air formed from supply ports 61. Three support members 62 are provided, generally of the form shown in FIGURE 2. In operation the vehicle may be at such a height above the surface that the members 62 are completely clear of the surface. Alternatively the vehicle may be operated at such a height that a slight load is carried by the members 62. In either case, the members 62 provide a convenient means for moving the vehicle when the normal air cushion forming means is in operation. The air for both the air curtains for the main supporting cushion and for the support members 62 can be from the same source. In the example illustrated in FIGURE 12, air is drawn in through an intake 65 by a propeller 66 driven by an engine 67 and is forced by the propeller through the ducts shown in broken lines in the figure to the curtain supply ports 61. Assuming that the support members 62 are generally of the form shown in FIGURE 2, these ducts also deliver air to the supply ports 4 and 12 of the support members via ducts 5 and 11, and to further supply ports 15. Air may also be ejected through louvres 68 on both sides of the vehicle for propulsion and steering. For this purpose, it will be understood that the louvres may be mounted for pivotal movement about vertical axes in conventional manner so as to vary the angle of ejection of the air.

Where, for example, vehicles are supported by cushions contained at any portion of the periphery of the vehicle by a flexible member, sets of load carrying apparatus, as described above, particularly as shown in FIGURE 2, may be provided in the bottom of the flexible member to enable it to rise readily over irregularities in the surface over which the vehicle is travelling. Where that portion of the vehicle bottom from which issues the air curtain or curtains is flexibly attached to the main body of the vehicle, as described for example in the specification of co-pending application Serial No. 837,502, filed September 1, 1959, the sets of load carrying apparatus may be installed in the bottom of the flexibly attached portion, and can be used to deflect it upwards over obstacles.

Although the examples illustrated in FIGURES 1–8 have been described and shown as load carrying members positioned above and operating on fixed horizontal surfaces, they could be operated as load carrying members with respect to surfaces which lie at any angle up to and including the vertical. They can also be used in inverted position with the surfaces above the load carrying members, as for example, where the load carrying members are mounted in a fixed support and loads travel over the support, as in a ball-type conveyor.

In a further form of the invention as applied to a vehicle, for example as illustrated in FIGURES 13 and 14, the load carrying apparatus comprises an inner member 70 projecting from the side of the vehicle round which moves an endless flexible member 71, rather as in a track-laying vehicle such as a tractor. The flexible member 71, may be supported over the top and round the ends of the inner member by rollers 73 or the like. The bottom surface of the inner member 70 is supported clear of the flexible member 71 by cushions of pressurised air formed and maintained by curtains of air formed from supply ports 74 in the bottom surface of the inner member.

Instead of the flexible member moving round only one inner member, several inner members may project from the side of the vehicle and one continuous flexible member encompasses all the inner members as shown in FIGURE 15. As indicated in this figure, each inner member 76 may be independently and resiliently supported from the main body of the vehicle by suitable resilient members 77, such as springs to provide improved operation over rough ground. Alternatively, as shown in FIGURE 16, the flexible member 71 may move round the entire vehicle, in which case the whole of the bottom of the vehicle may be supported clear of the flexible member by one or more cushions of pressurised air. Such an arrangement will give very low bearing pressures on the surface beneath the flexible member.

When the flexible member is supported by rollers or the like for part of its length, these may be provided with flanges to provide positive location. The flexible member can however be supported both over the top and round the ends of the inner member, or members, by further cushions of pressurised air. In such a case, it will be necessary to provide some means for locating the flexible member with respect to the inner member, such as rollers contacting the edges of the flexible member.

In a vehicle supported over a surface by means of flexible members moving round inner members, projecting from the sides of the vehicle as described above, it is also possible to form one or more further cushions of pressurised air beneath the main body of the vehicle. For example, in FIGURE 14, supply ports can be provided in the bottom surface of the main body of the vehicle, as indicated by the dotted lines 78. This will give low bearing pressures on the surface whilst still retaining the resistance to undesired sideways movement provided by the flexible members.

In the examples described, and illustrated, the air curtains have been considered as being of a simple form. The curtains may, however, be of a more complex form, particularly where the support members are large. Such complex curtain forms are those, for example, described in the specification of co-pending application Serial No. 837,428, filed September 1, 1959, in which at least part of the air forming the curtains is recovered and re-used.

I claim:

1. Load carrying apparatus for movably supporting a load comprising a first member and a second member, capable of relative movement, the first member having at least one surface co-operating with at least one surface of the second member, the co-operating surfaces being substantially parallel and spaced apart when said apparatus is in operation, at least one port formed in one of the co-operating surfaces and extending in a substantially continuous manner to define the periphery of a cushion surface, and means for causing fluid to issue from said port and form at least one curtain of fluid which flows across the gap between the co-operating surfaces at a substantial angle thereto and is of sufficient lateral extent to peripherally enclose a space between said surfaces, said curtain being operative to form and maintain at least one cushion of pressurised fluid in the said space in contact with said cushion surface.

2. Apparatus as claimed in claim 1 including means for forming at least one further curtain of fluid which subdivides the cushion space between the surfaces of the two members.

3. Apparatus as claimed in claim 1 including a further member, and means for resiliently mounting said first member on said further member.

4. Load carrying apparatus for movably supporting a load comprising a first member forming a housing having a concave symmetrical surface of rotation, a second member partially surrounded by the said housing and capable of rotation within the said housing, the surface of the second member and the concave surface of the first member being substantially parallel and spaced apart when said apparatus is in operation, and means for forming at least one curtain of fluid which issues from a continuous port in said first member, flows across the gap between the two surfaces at a substantial angle thereto and is of sufficient lateral extent to peripherally enclose a space between said surfaces, said curtain being operative to form and maintain at least one cushion of pressurised fluid in said space, the cushion tending to maintain a clearance between the two surfaces.

5. Apparatus as claimed in claim 4 in which at least one fluid curtain is formed in a plane above the horizontal diametral plane of the second member.

6. Apparatus as claimed in claim 4 including means for forming at least one further curtain of fluid which subdivides the said space between the two surfaces of said first and second members.

7. Apparatus as claimed in claim 4 including a further member, and means for resiliently mounting said first member on said further member.

8. Load carrying apparatus comprising a member having a spherical outer surface, a housing having a part spherical inner surface partially enclosing said spherical member and of a radius of curvature sufficiently larger than that of said spherical member to provide a gap between the two surfaces, at least one port formed in the inner surface of said housing and extending in a substantially continuous manner to define the periphery of a cushion surface, and means for causing fluid to issue from said port and from a curtain of moving fluid which flows substantially radially inwards from the surface of said housing across said gap in a zonal configuration so as to enclose a part-spherical space between the two surfaces and to form and maintain within said space at least one cushion of pressurised fluid in contact with said cushion surface which tends to maintain clearance between the two surfaces.

9. Apparatus as claimed in claim 8 including means for forming at least one further curtain of moving fluid extending substantially radially across said gap and subdividing said part-spherical space.

10. Apparatus as claimed in claim 8 including a further member, and means for resiliently mounting said housing on said further member.

11. Apparatus as claimed in claim 8 wherein said fluid curtain lies in a narrow horizontal zone above the horizontal diametral plane of said spherical member.

12. Apparatus as claimed in claim 11 including means for forming at least one further curtain of moving fluid extending substantially radially across said gap and subdividing said part-spherical space.

13. Load carrying apparatus comprising a cylindrical member, a housing having a part cylindrical inner surface partially enclosing said cylindrical member and of a sufficiently larger size to provide a gap between the two cylindrical surfaces, and means including at least one substantially continuously extending port in the inner surface of said housing for forming at least one curtain of moving fluid which flows substantially radially inwards across the gap between the cylindrical surfaces and peripherally encloses a part-cylindrical space between said surfaces, said curtain being operative to form and maintain a cushion of pressurised fluid within said space.

14. Apparatus as claimed in claim 13 including means for restraining endwise movement of said cylindrical member within said housing, said means comprising means for forming at least at one end of said cylindrical member a curtain of moving fluid which flows in a direction substantially axially of said cylindrical member towards an end face thereof and encloses a space between said end face of the cylindrical member and said housing, said last-named curtain forming and maintaining within said space a cushion of pressurised fluid tending to resist endwise movement of said cylindrical member in the direction towards the adjacent end of the housing.

15. Apparatus as claimed in claim 13 including a further housing wherein said first-named housing is slidably mounted, and resilient means interposed between said further housing and said first-named housing.

16. Apparatus as claimed in claim 13 wherein said curtain forming means form a plurality of fluid curtains each enclosing a separate space.

17. Apparatus as claimed in claim 16 including means for restraining endwise movement of said cylindrical member within said housing, said means comprising means for forming at each end of said cylindrical member a curtain of moving fluid which flows in a direction substantially axially of said cylindrical member towards the adjacent end face thereof and encloses a space between said end face and the end of said housing, said last-named curtains forming and maintaining within the spaces between the end faces of said cylindrical member and said housing cushions of pressurised fluid tending to resist endwise movement of said cylindrical member in directions towards the adjacent ends of the housing.

18. A vehicle for travelling over a surface comprising a body, and a plurality of sets of load carrying apparatus for movably supporting said body on said surface, each of said sets of load carrying apparatus including a first member and a second member, capable of relative movement, the first member having at least one surface co-operating with at least one surface of the second member, the co-operating surfaces of said members being substantially parallel and spaced apart when said apparatus is in operation, at least one port formed in one of said co-operating surfaces and extending in a substantially continuous manner to define the periphery of a cushion surface, and means for causing fluid to issue from said port and from at least one curtain of fluid which flows across the gap between the co-operating surfaces at a substantial angle thereto and is of sufficient lateral extent to peripherally enclose a space between said co-operating surfaces, said curtain being operative to form and maintain at least one cushion of pressurised fluid in said space in contact with said cushion surface.

19. A vehicle as claimed in claim 18 wherein said first member forms a housing having a concave symmetrical surface of rotation, and said second member is partially surrounded by said housing and capable of rotation therewithin.

20. A vehicle for travelling over a surface comprising a body, and a plurality of sets of load carrying apparatus for movably supporting said body on said surface, each of said sets of load carrying apparatus including a first member and a second member capable of relative movement, said second member having a spherical outer surface and said first member forming a housing having a part-spherical inner surface partially enclosing the spherical surface of said second member and of a radius of curvature sufficiently larger than that of said second member to provide a gap between the two surfaces, and means for forming at least one curtain of fluid which flows substantially radially inwards from the surface of said housing across said gap in a zonal configuration so as to enclose a part-spherical space between the two surfaces, said curtain being operative to form and maintain at least one cushion of pressurised fluid in said space.

21. A vehicle as claimed in claim 18 wherein said second member is cylindrical and said first member forms a housing having a part-cylindrical inner surface partially enclosing said second member and of a sufficiently larger to provide a gap between the two cylindrical surfaces, and wherein said curtain forming means directs at least one curtain of moving fluid substantially radially inwards across the gap between the cylindrical surfaces.

22. A vehicle for travelling over a surface comprising a body, means for producing a curtain of fluid issuing from the lower part of said body and at least partly forming and containing a cushion of pressurised gas between the body of said vehicle and said surface by which the vehicle is partly supported above said surface, and a plurality of sets of load carrying apparatus for movably supporting said body on said surface, each of said sets of load carrying apparatus including a first member and a second member, capable of relative movement, the first member having at least one surface co-operating with at least one surface of the second member, the co-operating surfaces of said members being substantially parallel and spaced apart when said apparatus is in operation, at least one port formed in one of said co-operating surfaces and extending in a substantially continuous manner to define the periphery of a cushion surface, and means for causing fluid to issue from said port and from at least one curtain of fluid which flows across the gap between the co-operating surfaces at a substantial angle thereto and is of sufficient lateral extent to peripherally enclose a space between said co-operating surfaces, said last-named curtain being operative to form and maintain at least one cushion of pressurised fluid in said space in contact with said cushion surface.

23. A vehicle as claimed in claim 22 wherein each of said sets of load carrying apparatus comprises a first member forming a housing having a concave symmetrical surface of rotation, and a second member partially surrounded by said housing and capable of rotation therewithin, the surface of said second member and the concave surface of said first member being substantially parallel.

24. A vehicle for travelling over a surface comprising a body, means for producing a curtain of fluid issuing from the lower part of said body and at least partly forming and containing a cushion of pressurised gas between the body of said vehicle and said surface by which the vehicle is partly supported above said surface, and a plurality of sets of load carrying apparatus for movably supporting said body on said surface, each of said sets of load carrying apparatus including a first member and a second member, capable of relative movement, said second member having a spherical outer surface and said first member forming a housing having a part-spherical inner surface partially enclosing the spherical surface of said second member and of a radius of curvature sufficiently larger than that of said second member to provide a gap between the two surfaces thereof, and means for forming at least one curtain of fluid which flows substantially radially inwards from the surface of said housing across said gap in a zonal configuration so as to enclose a part-spherical space between the two surfaces, said last-named curtain being operative to form and maintain at least one cushion of pressurised fluid in said space.

25. A vehicle as claimed in claim 22 wherein said second member is cylindrical and said first member forms a housing having a part-cylindrical inner surface partially enclosing said second member and of a sufficiently larger size to provide a gap between the two cylindrical surfaces, and wherein said curtain forming means directs at least one curtain of moving fluid substantially radially inwards across the gap between said cylindrical surfaces.

References Cited by the Examiner
UNITED STATES PATENTS

| 2,985,114 | 5/61 | Lindner | 180—7 |
| 3,074,764 | 1/63 | Bertelsen | 180—7 |

OTHER REFERENCES

"Flight," June 24, 1960, pages 868–870, Cushioncraft.

A. HARRY LEVY, *Primary Examiner.*

PHILIP ARNOLD, *Examiner.*

UNITED STATES PATENT OFFICE
CERTIFICATE OF CORRECTION

Patent No. 3,174,571 March 23, 1965

Christopher Sydney Cockerell

It is hereby certified that error appears in the above numbered patent requiring correction and that the said Letters Patent should read as corrected below.

Column 1, line 20, for "co-opearting" read -- co-operating --; column 3, line 57, for "members" read -- member --; column 4, line 34, for "art" read -- are --; line 37, for "suported" read -- supported --; line 69, for "rise" read -- ride --; column 5, line 33, after "springs" insert a comma; column 6, line 55, for "from" read -- form --; column 7, line 59, for "from", second occurrence, read -- form --; column 8, line 18, after "larger" insert -- size --; line 40, for "from", second occurrence, read -- form --.

Signed and sealed this 24th day of August 1965.

(SEAL)
Attest:

ERNEST W. SWIDER
Attesting Officer

EDWARD J. BRENNER
Commissioner of Patents